(12) United States Patent
Kearney

(10) Patent No.: US 7,485,065 B2
(45) Date of Patent: Feb. 3, 2009

(54) PRODUCING AND MAINTAINING A DESIRED BEARING PRELOAD IN A DIFFERENTIAL MECHANISM

(75) Inventor: Todd J. Kearney, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 11/491,617

(22) Filed: Jul. 24, 2006

(65) Prior Publication Data

US 2008/0020888 A1 Jan. 24, 2008

(51) Int. Cl.
*F16H 48/06* (2006.01)
*F16C 43/00* (2006.01)
(52) U.S. Cl. .................................. 475/230; 384/537
(58) Field of Classification Search .............. 384/537, 384/540, 583, 585, 906
See application file for complete search history.

(56) References Cited

U.S. PATENT DOCUMENTS

| | | | | |
|---|---|---|---|---|
| 1,880,655 A | * | 10/1932 | Baits | 475/246 |
| 2,016,343 A | * | 10/1935 | Oberem | 475/246 |
| 2,133,112 A | * | 10/1938 | Ormsby | 475/247 |
| 2,546,969 A | | 4/1951 | Buckendale | |
| 2,578,155 A | * | 12/1951 | Slider | 475/246 |
| 2,651,216 A | * | 9/1953 | Alden | 475/247 |
| 3,001,842 A | * | 9/1961 | Boyd | 384/585 |
| 3,006,700 A | * | 10/1961 | Hoffmann | 384/537 |
| 3,715,936 A | | 2/1973 | Jones | |
| 4,775,250 A | | 10/1988 | Stewart | |
| 5,046,870 A | * | 9/1991 | Ordo | 384/563 |
| 5,269,731 A | | 12/1993 | Scudder et al. | |
| 5,297,447 A | * | 3/1994 | Massaccesi | 74/607 |
| 5,727,886 A | * | 3/1998 | Hata et al. | 384/537 |
| 6,227,624 B1 | * | 5/2001 | Wiacek et al. | 301/105.1 |
| 6,398,689 B1 | | 6/2002 | Morse et al. | |
| 6,474,873 B1 | * | 11/2002 | Krisher et al. | 384/563 |
| 6,533,697 B2 | * | 3/2003 | Morse et al. | 475/230 |
| 6,736,544 B1 | | 5/2004 | DeWald | |
| 2005/0101430 A1 | | 5/2005 | Ziech | |

* cited by examiner

*Primary Examiner*—Dirk Wright
(74) *Attorney, Agent, or Firm*—David B. Kelley; MacMillan Sobanski & Todd, LLC

(57) ABSTRACT

An apparatus for producing a preload in a differential mechanism includes a housing formed with a first screw thread, a component located in the housing and for supported in revolution about a first axis on the housing by a bearing. A nut includes a second screw thread engaged with the first screw thread, recesses distributed about the first axis, and a preloaded surface that contacts the bearing with a force produced by applying torque tending to engage the first and second screw threads. A lock tab, secured against rotation relative to the nut, includes a surface that overlaps at least one of the recesses and by which the lock tab is secured to the nut.

17 Claims, 4 Drawing Sheets

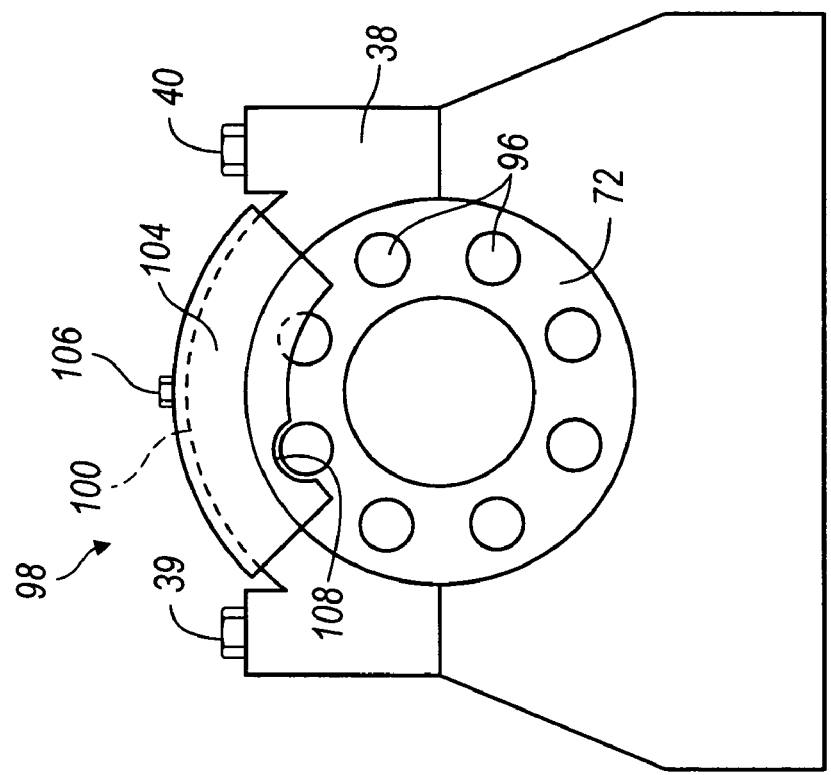
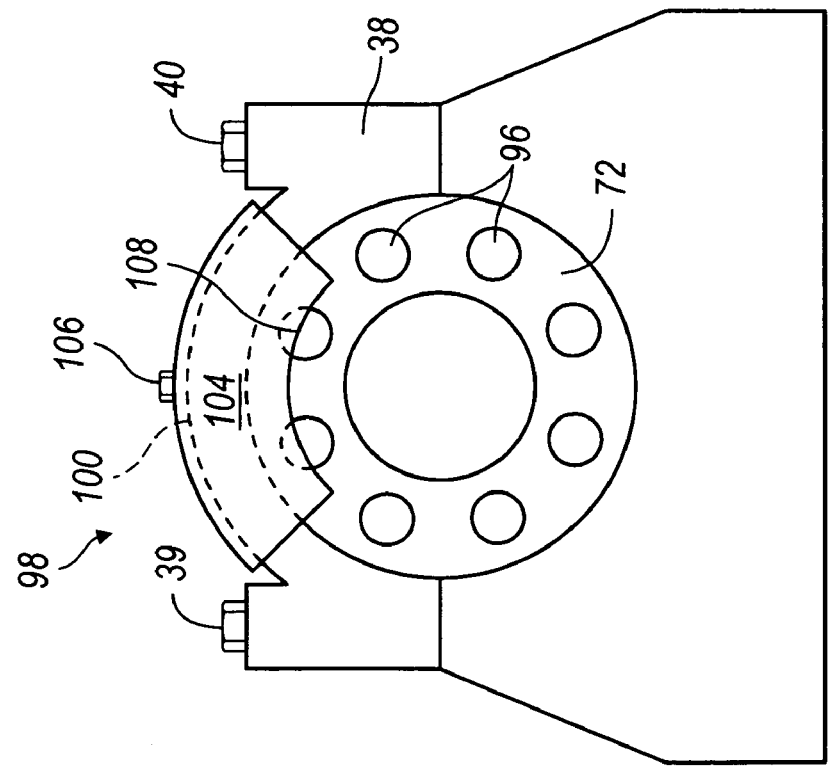
FIG. 4
FIG. 5 ium or cast iron; a ring gear 16 formed with beveled gear
PRODUCING AND MAINTAINING A DESIRED BEARING PRELOAD IN A DIFFERENTIAL MECHANISM

BACKGROUND OF THE INVENTION

The preferred embodiment relates generally to a differential gear mechanism and, in particular, to adjusting and securing the position of a differential bearing adjuster nut, which preloads a bearing.

In a differential gear mechanism, each laterally directed axle shaft is supported on the housing by a tapered roller bearing located between the shaft and housing. The bearing should be preloaded precisely to maximize its service life. Normally the bearing's outer race contacts an inner surface of the housing. A preload force is applied to the bearing's inner race by rotating a adjuster nut on a screw thread such that an axial inner face of the nut is forced in axial contact against the axial outer face of the bearing's inner race.

The angular position of the adjuster nut and the magnitude of the preload can unintentionally change in service if the adjuster nut becomes loosened. Consequently it has become conventional in the automotive industry to secure the angular position of the adjuster nut at its approximate ideal location using a lock tab, whose angular position is substantially fixed. A conventional lock tab engages a hole formed on the adjuster nut. However, after the adjuster nut has been used to preload the bearing, the angular position of each hole on the nut is often misaligned from the location of the lock tab. Therefore, to ensure that the lock tab will engage a hole on the adjuster nut, the angular position of the adjuster nut is changed by rotating it into alignment with the lock tab. This changes the desired magnitude of the bearing preload. Then the lock tab is forced into engagement with an appropriate hole on the adjuster nut. This procedure causes the magnitude of the bearing preload to be different from its optimal magnitude, an undesirable condition that can adversely affect the function of the axle and its service life.

There is a need to secure accurately the adjuster nut at the angular position that precisely preloads the bearing such that the corresponding service life of the differential mechanism is optimal.

SUMMARY OF THE INVENTION

An apparatus for producing a preload in a differential mechanism includes a housing formed with a first screw thread, and a component located in the housing and for supported in revolution about a first axis on the housing by a bearing. An adjuster nut includes a second screw thread engaged with the first screw thread, recesses distributed about the first axis, and a preloaded surface that contacts the bearing with a force produced by applying torque tending to engage the first and second screw threads. A lock tab, secured against rotation relative to the nut, includes a surface that overlaps at least one of the recesses and by which the lock tab is secured to the nut.

The differential bearing preload is established with a precise, desired magnitude at a parts plant, without any potential for the nut to loosen because the lock tab and nut are secured mutually in their stable positions. Contrary to this, the magnitude of the preload produced by a conventional lock tab and nut is proportional to the number of lock holes formed on the nut.

The magnitude of the desired preload is infinitely variable and unrestricted to any number of engagement holes on the adjuster nut. The lock tab is preferably a metal stamping that is attached to the differential bearing support structure, such as a differential bearing cap, and conforms to the contour of the circumference of the adjustable differential bearing adjuster nut. A leg of the lock tab overlaps at least one of the recesses or holes on the adjuster nut.

After the differential preload is set by applying torque to engage screw threads on the nut with threads on the housing, the lock tab is secured to the differential bearing support structure. Then, a portion of the lock tab is deformed into engagement with a recess or hole on the nut, preferably by using metal forming machine, such as a punch. The metal forming machine tool stakes an edge of the lock tab, moving a portion of the lock tab into an adjuster nut lock hole.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which:

FIG. 4 is an end view showing the lock tab overlapping the adjuster nut before staking the tab to the nut; and FIG. 5 is an end view showing the lock tab staked to the nut.

DESCRIPTION OF THE PREFERRED EMBODIMENT

Figure 1:
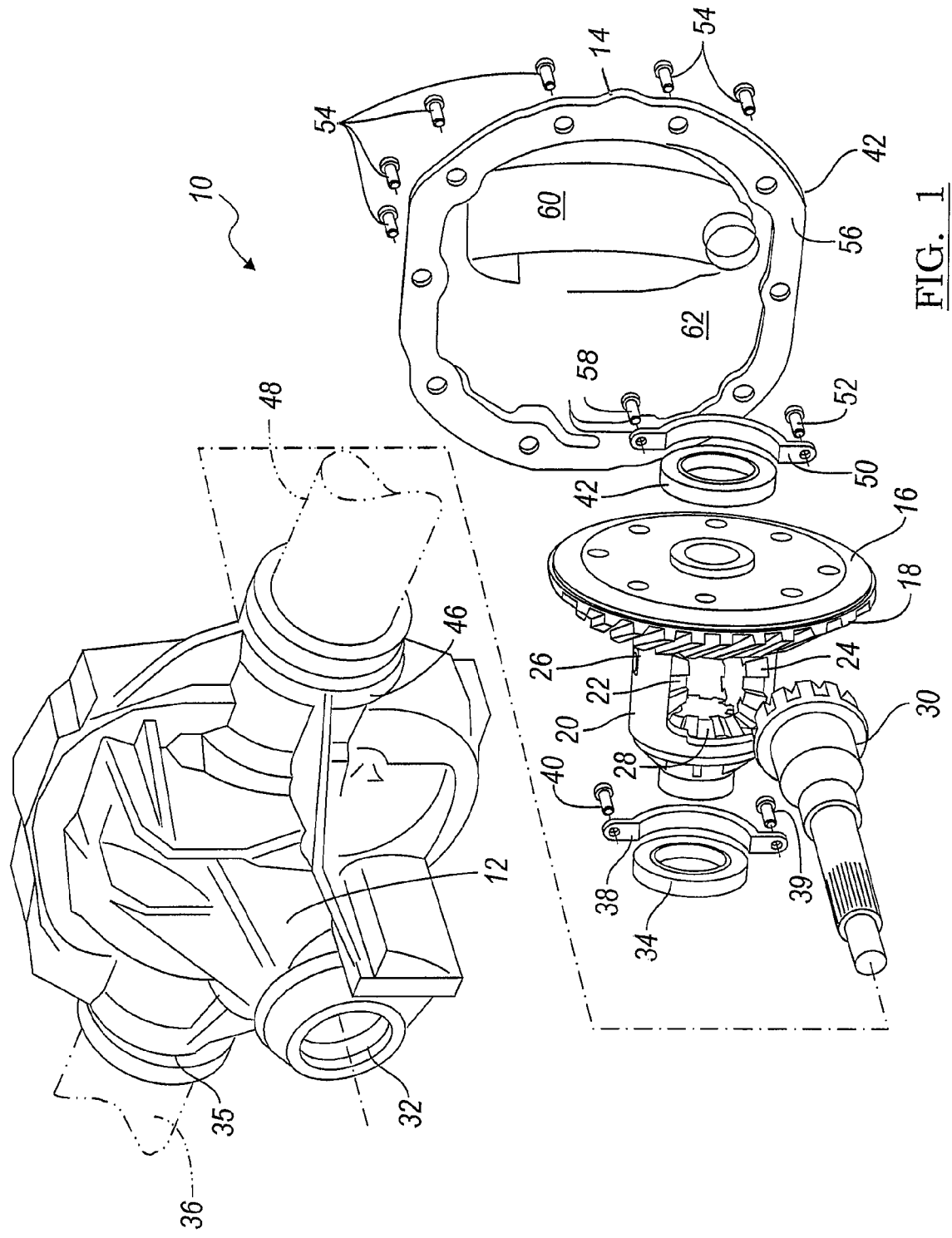
FIG. 1 is a perspective view of a differential assembly with its components shown mutually spaced in their approximate relative positions.

Referring first to FIG. 1, a differential mechanism 10 for transmitting power differentially to left-side and right-side axle shafts includes a housing 12, preferably of cast aluminum or cast iron; a ring gear 16 formed with beveled gear teeth 18; a carrier 20 secured to the ring gear; bevel pinions 22, 24 driveably connected to the carrier by a pin 26; a right-side bevel gear 28; and a left-side bevel gear (hidden from view by the ring gear) in continuous meshing engagement with the bevel pinions 22, 24. The teeth 18 of ring gear 16 are in mesh with a bevel pinion 30, which extends through an opening 32 in the housing to the differential mechanism 10. Bevel pinion 30 is connected to a companion flange (not shown), which in turn is connected to a driveshaft (not shown), which transmits output torque from a transmission or a transfer case to the differential mechanism 10.

The side bevel gears 28 are driveably connected, respectively, to a right-side shaft and left-side shaft (not shown), each shaft being drivable connected to a wheel of the vehicle. The right-side shaft is supported by carrier 20 and an additional bearing (not shown) which may be located in housing 12 or in a remote location at the opposite end of axle tube 36, which extends rightward from the differential housing 12 to the right-side wheel. The carrier 20 is supported in housing 12 at a bearing 34 located in a bore on a local boss 35. Bearing 34 is is secured to the housing 12 by a bearing cap 38 and bolts 39, 40 threaded into the housing. Similarly, the left-side shaft is supported by carrier 20 and an additional bearing (not shown), which may be located in housing 12 or at the opposite end of axle tube 48 that extends leftward from the differential housing 12 to the left-side wheel. The carrier 20 is supported at the left side of the housing 12 by a bearing 42 located in a bore 44 formed in a local boss 46. Bearing 42 is secured to the housing 12 by a bracket 50 and bolts 52, 53 threaded into the housing.

The cover 14 is secured to the housing 12 by bolts 54, which extend through a mounting flange 56 and engage threaded holes formed in the housing. A hollow vent tube 58 passes through the wall of the cover.

The inner surface of the cover 14 is formed with a depression 60, which is set back from the adjacent interior surface 62 and is sized to accommodate the ring gear 16. The inner surfaces of the housing 12 and cover 14 together define an interior space containing the mechanical components of the differential mechanism 10. A volume of hydraulic lubricant is also located at the bottom of the interior space bounded by the housing and cover. The ring gear 16 rotates through the lubricant in the sump, wetting the surfaces of the gear teeth formed on the ring gear.

Figure 2:
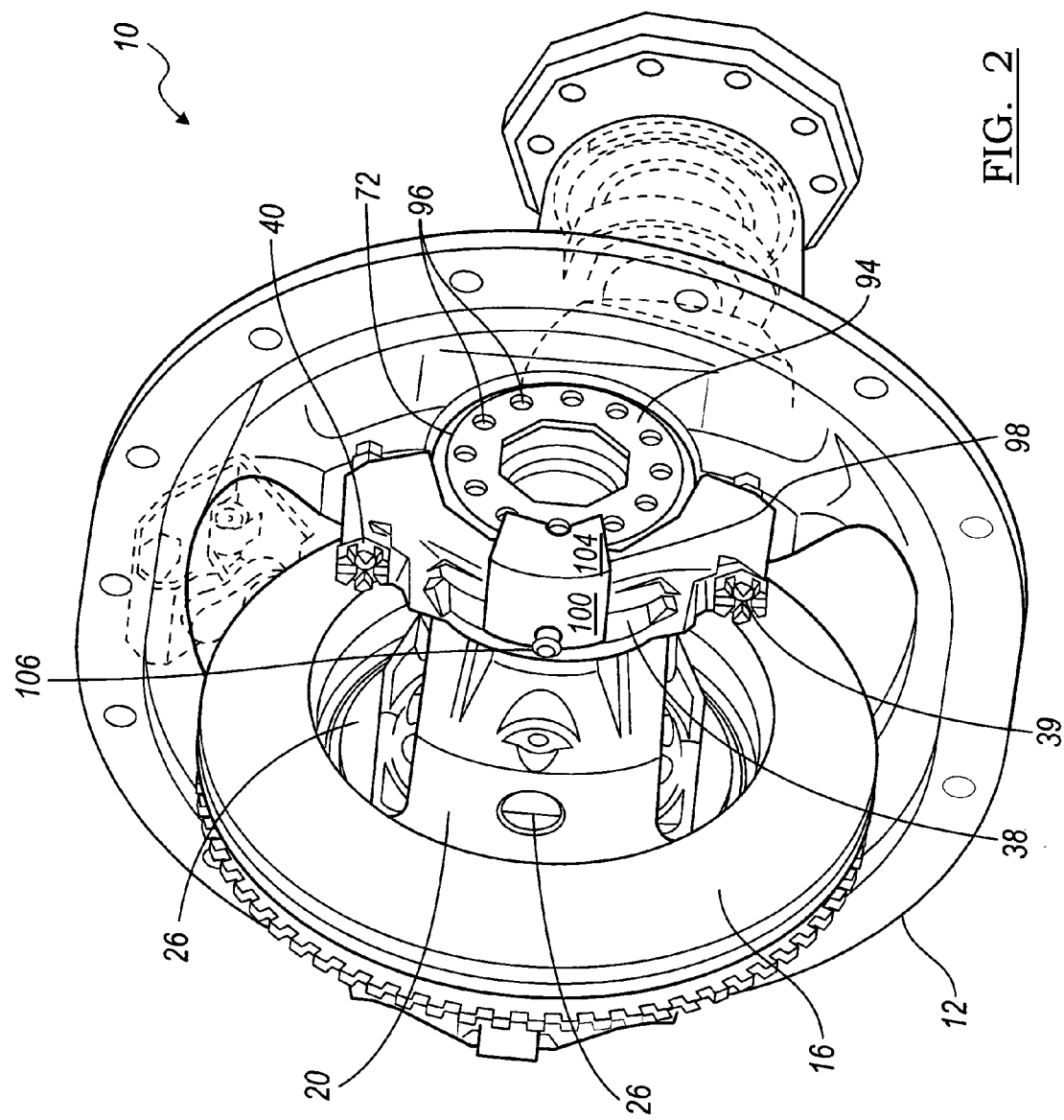
FIG. 2 is an isometric cross section of the differential mechanism of FIG. 1 showing the rear cover removed, a lock tab and an adjuster nut.
Figure 3:
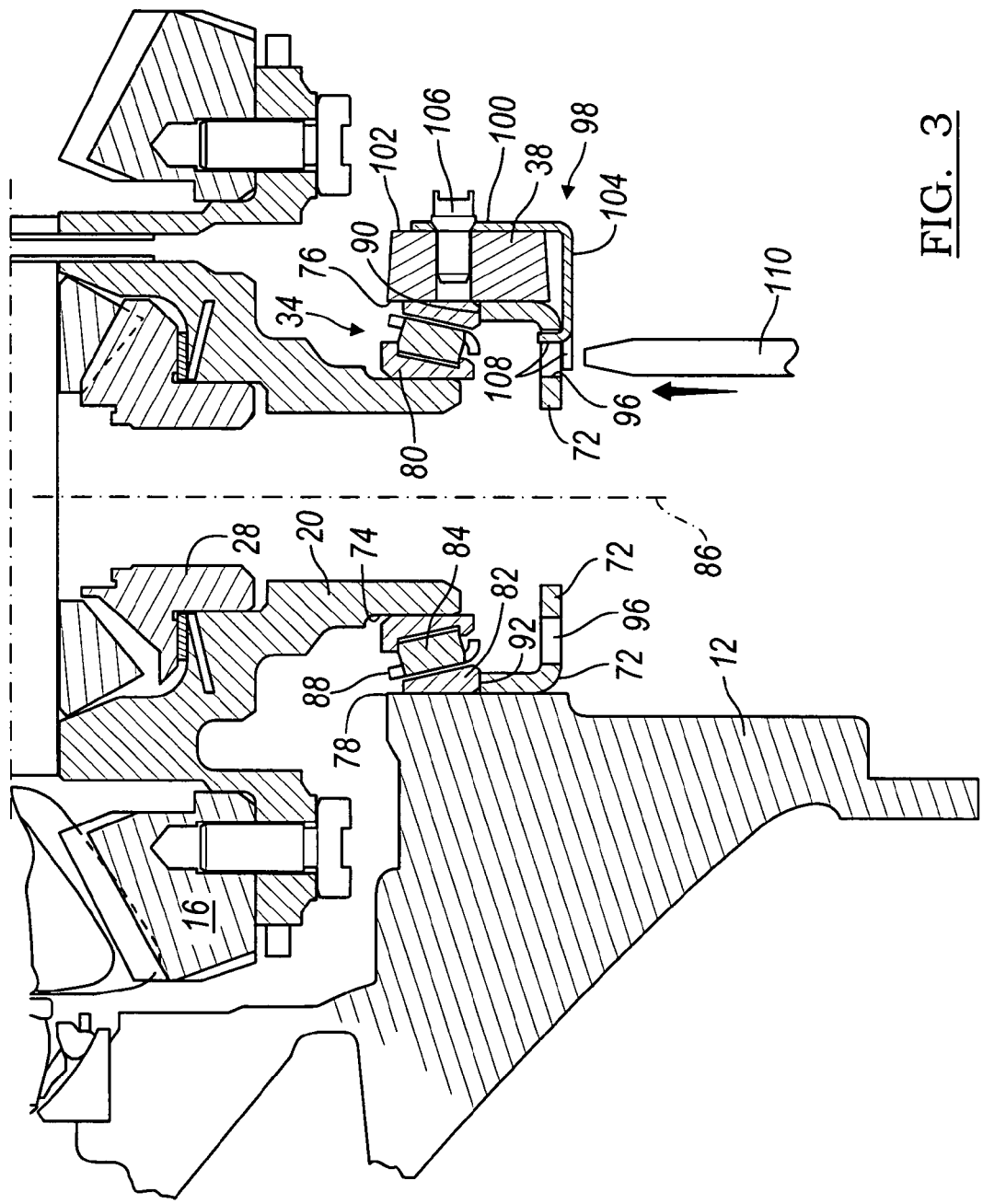
FIG. 3 is a cross section of the differential mechanism of FIG. 1.

FIGS. 2 and 3 illustrate an adjuster nut 72 assembled in the differential mechanism 10 and secured by a threaded connection to the housing 12 and bearing cap 38. The bearing 34 is located in an annular space, whose radial inner surface contacts the carrier 20 and whose radial outer surfaces contacts the bearing cap 38 and housing 12, which surround the bearing. Preferably, the bearing 34 is a tapered roller bearing, which includes an inner race 80 contacting surface 74 of the carrier, an outer race 82 contacting surfaces 76, 78, and a set of rollers 84 mutually angularly spaced about axis 86 and retained in a cage 88. After the bearing 34 and bearing cap 38 are installed in the housing 12, the adjuster nut 72 is threaded into the housing and bearing cap, thereby bringing the inner axial face 90 of the nut 72 close to the axial outer face 92 of the bearing's outer race 82.

FIG. 2 shows that the axial outer face 94 of the retainer nut 72 is formed with about twelve holes or recesses 96 spaced angularly about axis 86. After retainer nut 72 is installed, torque is applied causing engagement with the mating treads of the housing, and forcing its axial face 90 against the axial face of the bearing's outer race 92. This tightening of the engaged threads on the adjuster nut 72 and housing 12 causes the bearing 34 to become preloaded by forcing the conical surfaces of the bearing races 80, 82 radially against the rollers. The ideal magnitude of the preload on the bearing is related to a predetermined magnitude of torque applied to the adjuster nut 72.

After the bearing is preloaded, a lock tab 98 is installed. The lock tab 98 has the cross section of an angle, including a first, axial leg 100 that extends along the radial outer surface 102 of the bearing cap 38, and a second, radial leg 104 that extends toward axis 86 from leg 100. A bolt 106, threaded into bearing cap 38, engages the axial leg 100 of the lock tab 98 and secures it to the bearing cap. Immediately after the lock tab 98 is installed, a radial inboard length 108 of its radial leg 104 overlaps at least one of the holes 96 of the adjuster nut 72, as shown in FIG. 4.

Next, as FIGS. 3-5 show, a punch 110 is aligned with one of the holes 96 on the adjuster nut 72 that is at least partially covered by the radial inboard length 108 on the radial leg 104 of lock tab 98. The punch 110 may be a component of a metal forming machine. Alignment of the punch 110 with a suitable hole 96 on the nut 72 is facilitated because each hole 96 is preferably equally spaced from the other holes about axis 86, and is located at the same radius from axis 86 as the other holes on adjuster nut 72. After the punch 110 is aligned with a hole 96 that is at least partially covered by the lock tab 98, the punch 110 strikes the radial inner length 108 of the lock tab at the hole, moving the radial length 108 of leg 104 into the adjuster nut hole 96. This process allows the differential bearing preload to be applied and eliminates the need to change the angular position of the adjuster nut after it has been torqued to produce the desired magnitude of bearing preload.

Although lock tab 98 has been described with reference to maintaining a preload on bearing 34, the lock tab can be applied to bearing 42, which supports the carrier at the opposite lateral side from that of bearing 34.

In accordance with the provisions of the patent statutes, the preferred embodiment has been described. However, it should be noted that the alternate embodiments can be practiced otherwise than as specifically illustrated and described.

What is claimed is:

1. Apparatus for maintaining a preload in a differential mechanism comprising:
    a housing;
    a component located in the housing;
    a bearing located in a space between the housing and the component;
    a nut, secured to the housing by a screw thread, including recesses distributed about an axis
    a lock tab secured against rotation and deformed into engagement with one of the recesses while the nut preloads the bearing.

2. The apparatus of claim 1 wherein the component is a carrier assembly that includes:
    a carrier supported on the bearing for revolution about the first axis;
    a ring gear secured to the carrier;
    beveled pinions secured to the carrier for revolution therewith and for rotation about a second axis transverse to the first axis; and
    side beveled gears in meshing engagement with the pinions.

3. The apparatus of claim 1 wherein the apparatus includes:
    a non-rotating component; and the lock tab includes:
        a first leg secured to the non-rotating component; and
        a second leg that overlaps at least one of the recesses including a surface for engaging at least one of the recesses.

4. The apparatus of claim 1 wherein the apparatus includes:
    a non-rotating component and the bearing includes:
    an inner race contacting the carrier and including a first conical surface;
    an outer race surrounding the inner race, contacting the non-rotating component, and including a second conical surface facing the first conical surface; and
    a roller located between the first and second conical surfaces.

5. The apparatus of claim 1 wherein the nut includes:
    an axial outer face formed with the recesses;
    an axial inner face formed with the surface that faces the bearing; and
    an axial surface formed with a screw thread that engages the screw thread on the housing.

6. Apparatus for maintaining a preload in a differential mechanism, comprising:
    a housing formed with a first screw thread;
    a component located in the housing;
    a bearing for supporting the component on the housing about a first axis;

a nut including a second screw thread engaged with the first screw thread, recesses distributed about the first axis, and a preloaded surface that contacts the bearing with a force produced by applying torque tending to engage the first and second screw threads; and a lock tab secured against rotation and deformed into engagement with one of the recesses while the nut preloads the bearing.

7. The apparatus of claim 6 wherein the component is a carrier assembly that includes:

a carrier supported on the bearing for revolution about the first axis;

a ring gear secured to the carrier;

pinions secured to the carrier for revolution therewith and for rotation about a second axis transverse to the first axis; and side gears in meshing engagement with the pinions.

8. The apparatus of claim 6 wherein the lock tab includes:

a first leg secured against rotation about the first axis; and a second leg extending from the first leg, overlapping at least one of the recesses, and including a surface for engaging at least one of the recesses.

9. The apparatus of claim 6 wherein the bearing includes:

an inner race contacting the carrier and including a first conical surface;

an outer race surrounding the inner race, contacting the non-rotating component, and including a second conical surface facing the first conical surface; and a roller located between the first and second conical surfaces.

10. The apparatus of claim 6 wherein the nut includes:

an axially outer face formed with the recesses;

an axially inner face formed with the preloaded surface; and an axially directed surface formed with the second screw thread.

11. Apparatus for maintaining a preload in a differential mechanism, comprising:

a housing formed with a first screw thread;

a component located in the housing;

a bearing for supporting the component on the housing about an axis;

a nut including an axially directed surface formed with a second screw thread engaged with the first screw thread, an axially outer face formed with recesses distributed about the axis, and an axially inner face formed with a preloaded surface that contacts the bearing with a force produced by applying torque tending to engage the first and second screw threads and;

a lock tab secured against rotation and deformed into engagement with one of the recesses while the nut preloads the bearing.

12. The apparatus of claim 11 wherein the component is a carrier assembly that includes:

a carrier supported on the bearing for revolution about the axis;

a ring gear secured to the carrier;

pinions secured to the carrier for revolution therewith and for rotation about a second axis transverse to the axis; and side gears in meshing engagement with the pinions.

13. The apparatus of claim 11 wherein the lock tab includes:

a first leg secured against rotation about the axis; and a second leg extending from the first leg, overlapping at least one of the recesses, and including a surface for engaging at least one of the recesses.

14. The apparatus of claim 11 wherein the bearing includes:

an inner race contacting the carrier and including a first conical surface;

an outer race surrounding the inner race, contacting the non-rotating component, and including a second conical surface facing the first conical surface; and a roller located between the first and second conical surfaces.

15. A method for maintaining preload in a differential mechanism, comprising the steps of:

(a) locating a bearing between a rotating component and a non-rotating component;

(b) engaging screw threads on a nut with screw threads on the non-rotating component;

(c) preloading the nut against the bearing;

(d) installing a lock tab fixed against rotation and covering at least a recess on the nut;

(e) deforming the lock tab into engagement with the recess.

16. The method of claim 15, wherein step (e) is performed after step (c) and without altering the desired magnitude of torque applied to the nut.

17. The method of claim 15, wherein step (e) further comprises using a punch to deform a portion of the lock tab into a the recess.

* * * * *